(12) United States Patent
Chen

(10) Patent No.: US 10,411,518 B2
(45) Date of Patent: Sep. 10, 2019

(54) NON-CONTACT TRANSMISSION DEVICE FOR ELECTRONIC LOCK

(71) Applicant: Chung-Yu Chen, Taichung (TW)

(72) Inventor: Chung-Yu Chen, Taichung (TW)

(\*) Notice: Subject to any disclaimer, the term of this patent is extended or adjusted under 35 U.S.C. 154(b) by 351 days.

(21) Appl. No.: 15/594,398

(22) Filed: May 12, 2017

(65) Prior Publication Data

US 2018/0301944 A1  Oct. 18, 2018

(30) Foreign Application Priority Data

Apr. 17, 2017 (TW) .............................. 106205318 A

(51) Int. Cl.
| | |
|---|---|
| H02J 50/20 | (2016.01) |
| E05B 47/00 | (2006.01) |
| H01F 38/14 | (2006.01) |
| H02J 50/80 | (2016.01) |
| H02J 50/90 | (2016.01) |

(52) U.S. Cl.
CPC .............. *H02J 50/20* (2016.02); *E05B 47/00* (2013.01); *H01F 38/14* (2013.01); *H02J 50/80* (2016.02); *H02J 50/90* (2016.02); *E05B 2047/0061* (2013.01)

(58) Field of Classification Search
CPC . H02J 50/20; H02J 50/80; H02J 50/90; E05B 47/00; E05B 2047/0061; H01F 38/14; G07C 9/00103; G07C 9/00111; G07C 9/00309; G07C 9/00571; G07C 9/00126; G07C 9/00007
USPC ...................................................... 292/251.5
See application file for complete search history.

(56) References Cited

U.S. PATENT DOCUMENTS

| | | | |
|---|---|---|---|
| 10,078,929 B1* | 9/2018 | Chen ................... | G07C 9/00896 |
| 2010/0188509 A1* | 7/2010 | Huh .................... | G07C 9/00912 348/156 |
| 2017/0055751 A1* | 3/2017 | Sundaresan ......... | E05B 73/0011 |

\* cited by examiner

*Primary Examiner* — Nathan Cumar
(74) *Attorney, Agent, or Firm* — Sinorica, LLC

(57) ABSTRACT

A non-contact transmission device for an electronic lock includes a housing. The housing has an accommodation trough to accommodate a retainer in a slidable manner. The retainer is provided with an RFID coil. An inner side of the housing is formed with a positioning trough. When the retainer is slid in the accommodation trough, the RFID coil is positioned in the positioning trough, such that the RFID coil is closer to the outer edge of the housing without lowering the strength of the housing. When two non-contact transmission devices are mounted to a door frame and a door panel respectively, the distance between the RFID coils of the two non-contact transmission devices can be shortened to improve the transmission efficiency between the RFID coils.

8 Claims, 6 Drawing Sheets

NON-CONTACT TRANSMISSION DEVICE FOR ELECTRONIC LOCK

FIELD OF THE INVENTION

The present invention relates to a transmission device, and more particularly to a non-contact transmission device for an electronic lock.

BACKGROUND OF THE INVENTION

A conventional electronic door lock system mainly has a door frame and a door panel. The door frame is provided with a mouth piece, and the door panel is provided with an electronic lock. Each of the door frame and the door panel is equipped with a wireless power supply device. The wireless power supply device is a coil winding structure. The wireless power supply device mounted to the door frame is further connected with an external power source, and the wireless power supply device mounted to the door panel is connected with an electronic lock. Through electromagnetic induction, the electricity from the external power source is wirelessly transmitted to the electronic lock, achieving the purpose of wireless power supply.

However, the electromagnetic induction efficiency between the coils is inversely proportional to the distance between the coils. Because there is a certain spacing between the door panel and the door frame, there is also a spacing between the wireless power supply devices. Therefore, the transmission efficiency is lowered. The conventional wireless power supply device adopts the coil winding structure and cannot supply power and transmit data simultaneously. Accordingly, the inventor of the present invention has devoted himself based on his many years of practical experiences to solve these problems.

SUMMARY OF THE INVENTION

The primary object of the present invention is to provide a non-contact transmission device for an electronic lock. The distance between RFID coils of two non-contact transmission devices can be shortened to improve the transmission efficiency between the RFID coils.

In order to achieve the aforesaid object, the non-contact transmission device for an electronic lock of the present invention comprises a housing, a retainer, and a wireless transmission unit. The housing has a plate. One side of the plate is provided with a positioning trough and a circumferential frame surrounding the positioning trough. An accommodation trough is defined between the plate and the circumferential frame. The circumferential frame has an opening opposite the plate. The retainer is slidably connected to the accommodation trough from the opening. The retainer has a positioning portion corresponding to the positioning trough. The wireless transmission unit includes a control module disposed in the retainer. The control module is electrically connected with an RFID coil. The RFID coil is fixed to the positioning portion and positioned in the positioning trough.

When the non-contact transmission device of the present invention is assembled, the control module is first placed in the mounting trough of the retainer, and the RFID coil and the magnetism separation plate are attached to the positioning portion, and the entire retainer is mounted in the accommodation trough of the housing from the opening, and the RFID coil protrudes from the positioning portion and is positioned in the positioning trough to complete the assembly of the non-contact transmission device. Through a drawer-like design, the non-contact transmission device has a simplified structure and can be assembled conveniently. Since the housing is provided with the positioning trough, the RFID coil protrudes from the positioning portion and is positioned in the positioning trough when the retainer is mounted in the accommodation trough, so that the RFID coil is closer to the outer edge of the housing without lowering the strength of the housing. When two non-contact transmission devices are mounted to a door frame and a door panel respectively, the distance between the RFID coils of the two non-contact transmission devices can be shortened to improve the transmission efficiency between the RFID coils.

DETAILED DESCRIPTION OF THE PREFERRED EMBODIMENTS

Embodiments of the present invention will now be described, by way of example only, with reference to the accompanying drawings.

Figure 1:
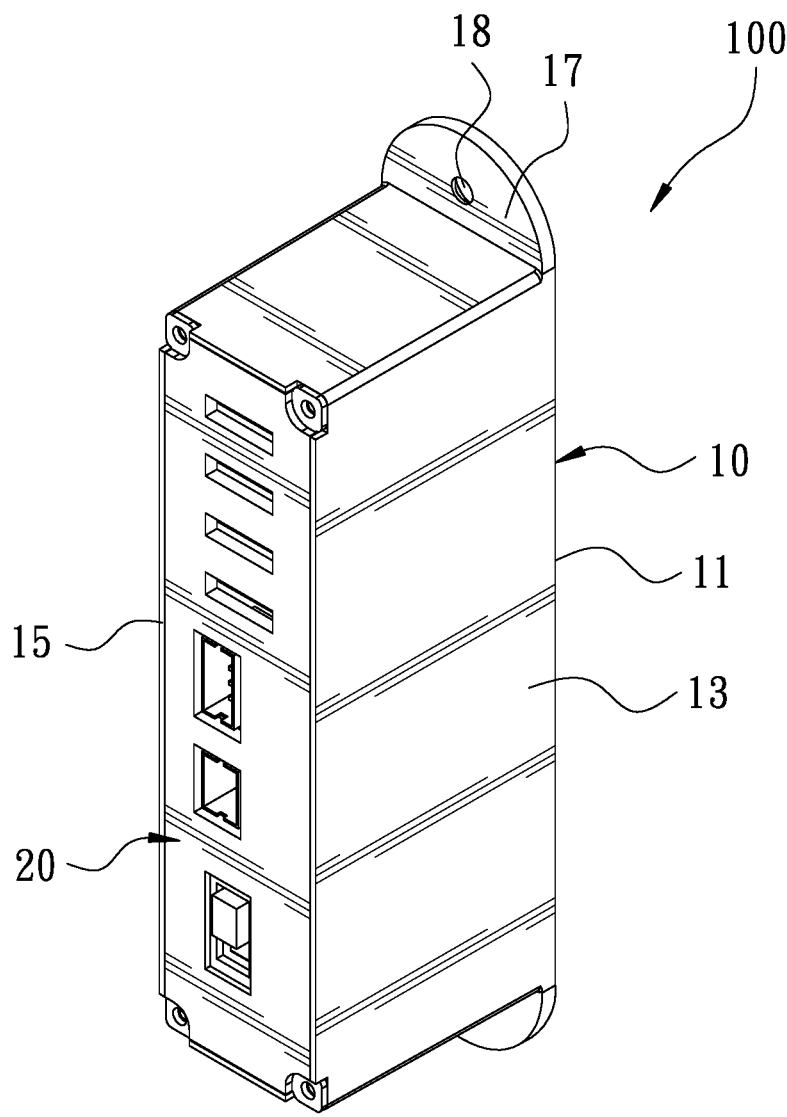
FIG. 1 is a perspective view in accordance with a preferred embodiment of the present invention.
Figure 2:
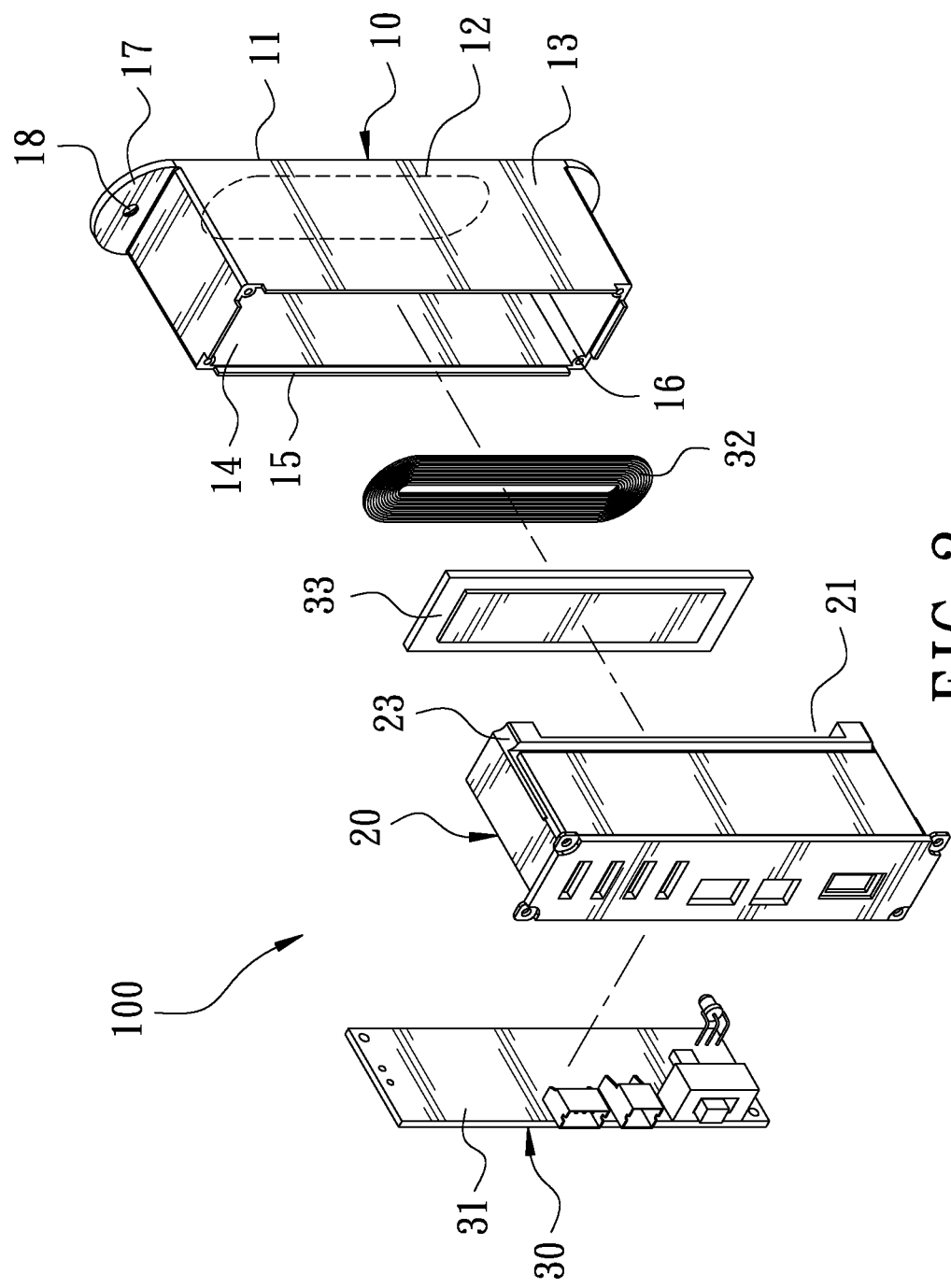
FIG. 2 is an exploded view in accordance with the preferred embodiment of the present invention.
Figure 3:
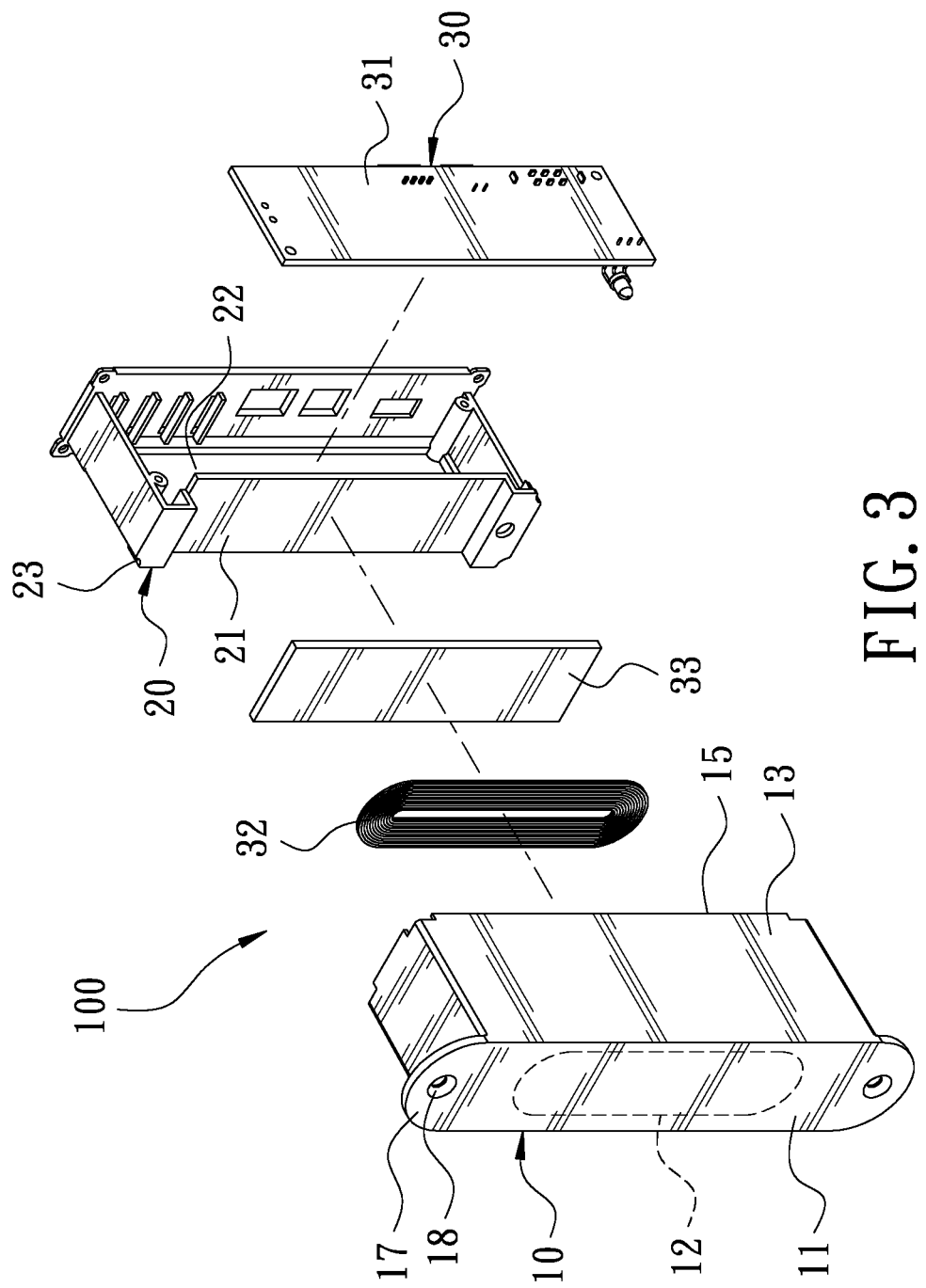
FIG. 3 is another exploded view in accordance with the preferred embodiment of the present invention.
Figure 4:
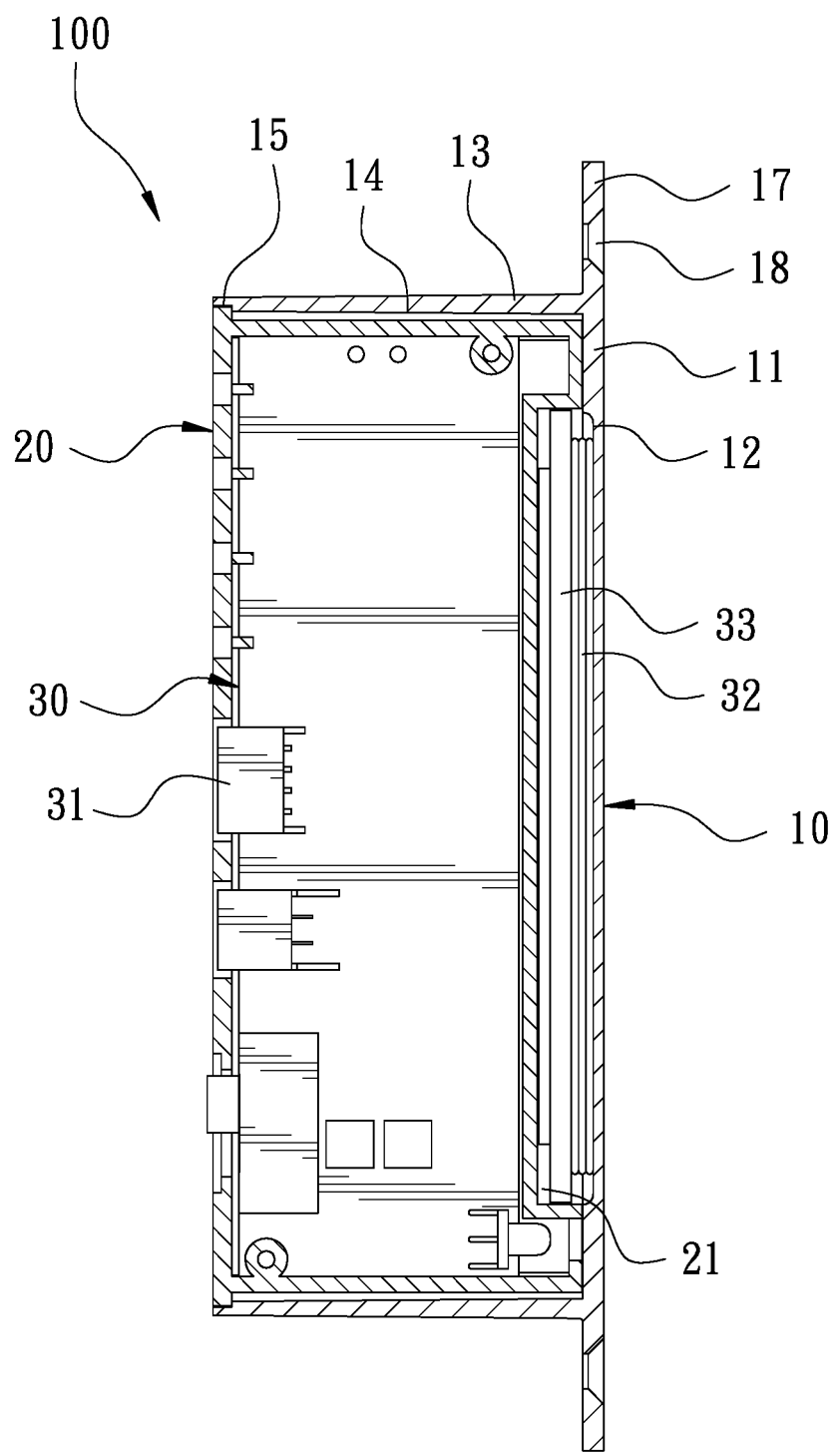
FIG. 4 is a longitudinal sectional view in accordance with the preferred embodiment of the present invention.
Figure 5:
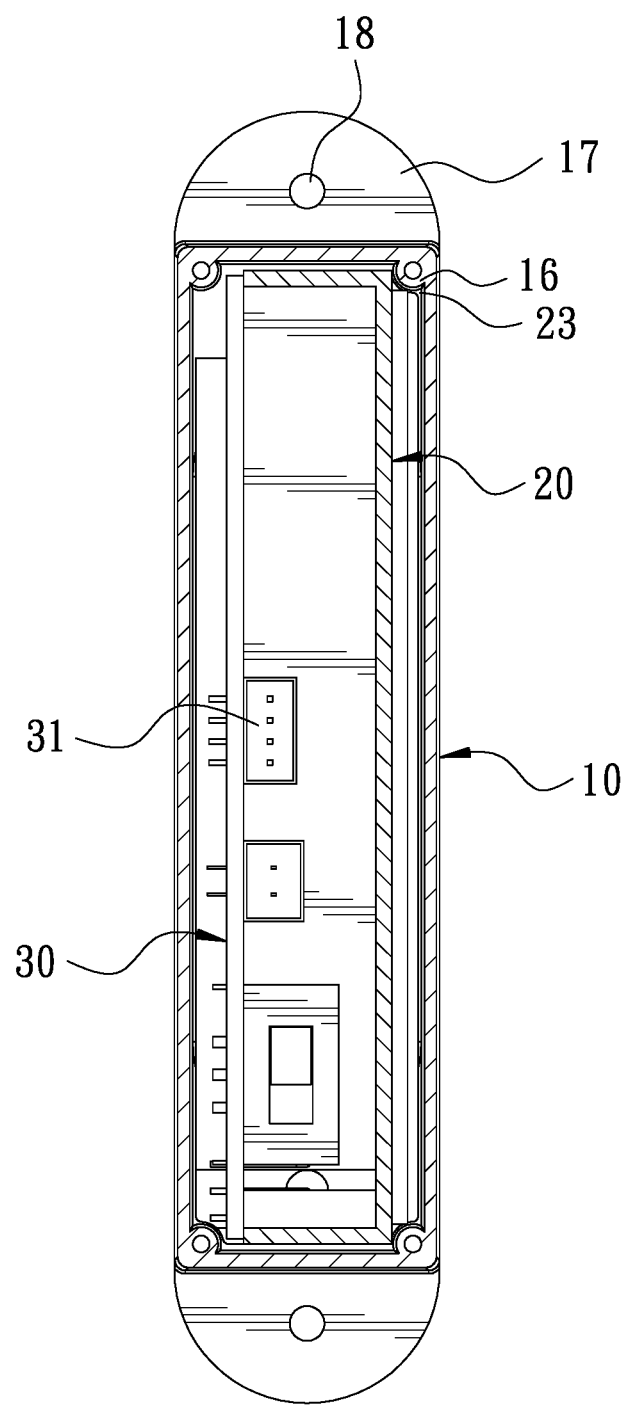
FIG. 5 is a lateral sectional view in accordance with the preferred embodiment of the present invention.

FIG. 1 is a perspective view in accordance with a preferred embodiment of the present invention. FIG. 2 is an exploded view in accordance with the preferred embodiment of the present invention. FIG. 3 is another exploded view in accordance with the preferred embodiment of the present invention. FIG. 4 is a longitudinal sectional view in accordance with the preferred embodiment of the present invention. FIG. 5 is a lateral sectional view in accordance with the preferred embodiment of the present invention. The present invention discloses a non-contact transmission device 100 for an electronic lock. The non-contact transmission device 100 comprises a housing 10, a retainer 20, and a wireless transmission unit 30.

The housing 10 has a plate 11. One side of the plate 11 is provided with a positioning trough 12 and a circumferential frame 13 surrounding the positioning trough 12. An accommodation trough 14 is defined between the plate 11 and the circumferential frame 13. The circumferential frame 13 has an opening 15 opposite the plate 11. The housing 10 is provided with at least one guide rib 16 disposed on an inner wall of the circumferential frame 13 and extending from the opening 15 toward the positioning trough 12. In this embodiment, the circumferential frame 13 is formed in a rectangular shape, and the four corners of the circumferential frame 13 are each provided with the guide rib 16. The plate 11 of the housing 10 is provided with a pair of lugs 17 each formed with a perforation 18.

The retainer 20 is slidably connected to the accommodation trough 14 from the opening 15. The retainer 20 has a positioning portion 21 corresponding to the positioning trough 12. In this embodiment, an outer side of the retainer 20 is formed with a recess to form the positioning portion 21 corresponding to the positioning trough 12. The outer side of the retainer 20 is formed with a mounting trough 22. The outer side of the retainer 20 is formed with at least one guide groove 23 corresponding to the guide rib 16, so that the guide rib 16 is slidably connected to the guide groove 23. In this embodiment, the retainer 20 is formed in a rectangular shape, and the retainer 20 is formed with a plurality of guide grooves 23 at four corners thereof.

The wireless transmission unit 30 includes a control module 31. The control module 31 is disposed in the mounting trough 22 of the retainer 20. The control module 31 is electrically connected with an RFID coil 32. The RFID coil 32 is formed in an oblong shape. One side of the RFID coil 32 is fixed to the positioning portion 21, and the other side of the RFID coil 32 protrudes from the positioning portion 21 and is positioned in the positioning trough 12. The wireless transmission unit 30 further includes a magnetism separation plate 33. The magnetism separation plate 33 is made of ferrite and disposed between the positioning portion 21 and the RFID coil 32.

Referring to FIG. 4 and FIG. 5, when the non-contact transmission device 100 is assembled, the control module 31 is first placed in the mounting trough 22 of the retainer 20, and the RFID coil 32 and the magnetism separation plate 33 are attached to the positioning portion 21, and the entire retainer 20 is mounted in the accommodation trough 14 of the housing 10 from the opening 15, and the RFID coil 32 protrudes from the positioning portion 21 and is positioned in the positioning trough 12 to complete the assembly of the non-contact transmission device 100. Through a drawer-like design, the non-contact transmission device 100 has a simplified structure and can be assembled conveniently. Since the housing 10 is provided with the positioning trough 12, the RFID coil 32 protrudes from the positioning portion 21 and is positioned in the positioning trough 12 when the retainer 20 is mounted in the accommodation trough 14, so that the RFID coil 32 is closer to the outer edge of the housing 10 without lowering the strength of the housing 10. The guide ribs 16 of the housing 10 are engaged with the guide grooves 23 of the retainer 20 to provide a guiding effect so that the user can quickly slide the retainer 20 into the accommodation trough 14 of the housing 10.

Figure 6:
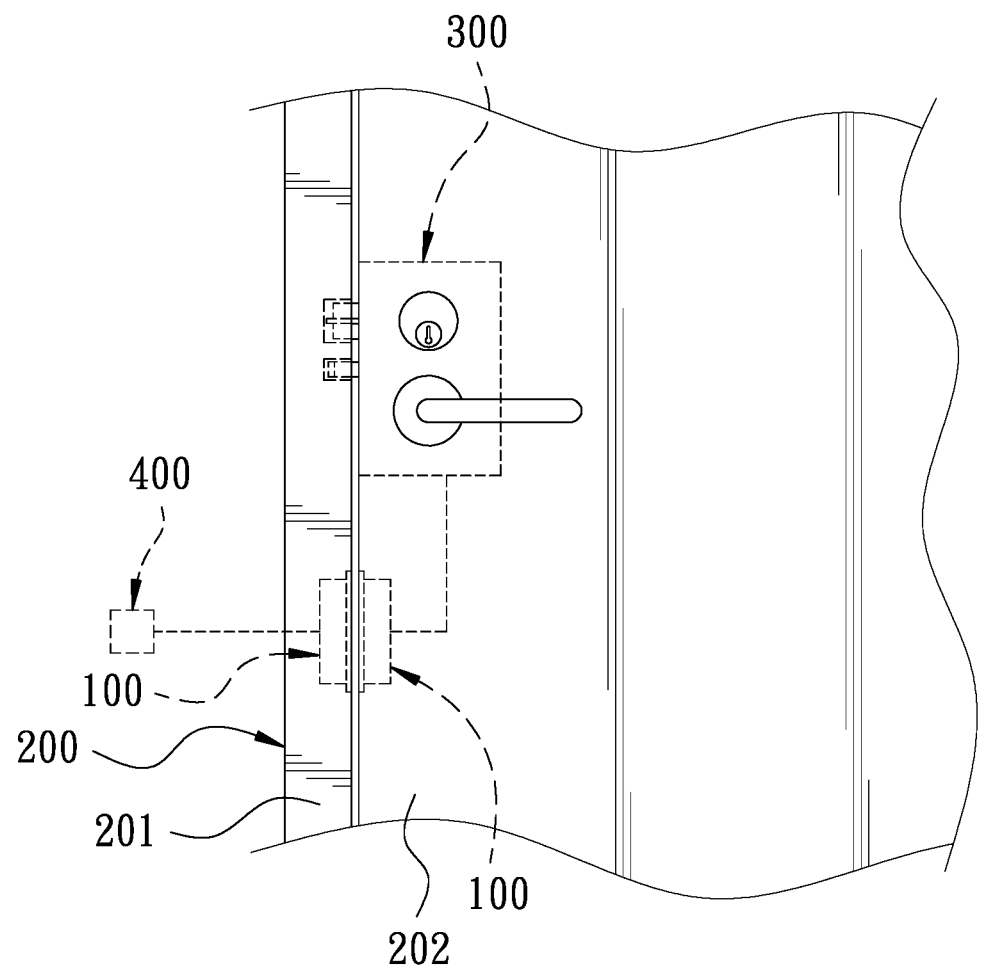
FIG. 6 is a schematic view in accordance with the preferred embodiment of the present invention when in use.

FIG. 6 is a schematic view in accordance with the preferred embodiment of the present invention when in use. Two non-contact transmission devices 100 are mounted to a door 200. The door 200 has a door frame 201 and a door panel 202. The door panel 202 is provided with an electronic lock 300. The two non-contact transmission devices 100 are mounted to the door frame 201 and the door panel 202, respectively. The two non-contact transmission devices 100 are arranged face to face. The non-contact transmission device 100 mounted to the door frame 201 is further connected with an external power source 400. The non-contact transmission device 100 mounted to the door panel 202 is connected with an electronic lock 300. Through the non-contact transmission devices 100, the electricity supplied from the external power source 400 can be transmitted to the electronic lock 300 by electromagnetic induction, such that the electronic lock 300 can be driven to actuate. The RFID coil 32 is positioned closer to the outer edge of the housing 10 through the positioning trough 12 of the housing 10, so that when the two non-contact transmission devices 100 are mounted to the door frame 201 and the door panel 202 respectively, the distance between the RFID coils 32 of the two non-contact transmission devices 100 can be shortened to improve the transmission efficiency between the RFID coils 32.

It is worth mentioning that the magnetic field strength of the RFID coil 32 can be increased and the external interference can be reduced through the magnetism separation plate 33 between the positioning portion 21 and the RFID coil 32 so as to improve the transmission efficiency between the RFID coils 32 of the two non-contact transmission devices 100. The non-contact transmission device 100 uses the RFID coil 32 to perform electromagnetic induction. Therefore, it is able to transmit data by means of carrier wave while supplying power, thereby achieving the effect of supplying power and transmitting data at the same time.

When the non-contact transmission device 100 of the present invention is assembled, the control module 31 is first placed in the mounting trough 22 of the retainer 20, and the RFID coil 32 and the magnetism separation plate 33 are attached to the positioning portion 21, and the entire retainer 20 is mounted in the accommodation trough 14 of the housing 10 from the opening 15, and the RFID coil 32 protrudes from the positioning portion 21 and is positioned in the positioning trough 12 to complete the assembly of the non-contact transmission device 100. Through a drawer-like design, the non-contact transmission device 100 has a simplified structure and can be assembled conveniently. Since the housing 10 is provided with the positioning trough 12, the RFID coil 32 protrudes from the positioning portion 21 and is positioned in the positioning trough 12 when the retainer 20 is mounted in the accommodation trough 14, so that the RFID coil 32 is closer to the outer edge of the housing 10 without lowering the strength of the housing 10. When the two non-contact transmission devices 100 are mounted to the door frame 201 and the door panel 202 respectively, the distance between the RFID coils 32 of the two non-contact transmission devices 100 can be shortened to improve the transmission efficiency between the RFID coils 32.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A non-contact transmission device for an electronic lock, comprising:
   a housing, having a plate, one side of the plate being provided with a positioning trough and a circumferential frame surrounding the positioning trough, an accommodation trough being defined between the plate and the circumferential frame, the circumferential frame having an opening opposite the plate;
   a retainer, slidably connected to the accommodation trough from the opening, the retainer having a positioning portion corresponding to the positioning trough; and
   a wireless transmission unit, including a control module disposed in the retainer, the control module being electrically connected with an RFID coil, the RFID coil being fixed to the positioning portion and positioned in the positioning trough.

2. The non-contact transmission device as claimed in claim 1, wherein an outer side of the retainer is formed with a recess to form the positioning portion corresponding to the positioning trough.

3. The non-contact transmission device as claimed in claim 1, wherein the wireless transmission unit further includes a magnetism separation plate, and the magnetism separation plate is disposed between the positioning portion and the RFID coil.

4. The non-contact transmission device as claimed in claim 3, wherein the magnetism separation plate is made of ferrite.

5. The non-contact transmission device as claimed in claim 1, wherein the RFID coil has an oblong shape.

6. The non-contact transmission device as claimed in claim 1, wherein an outer side of the retainer is formed with a mounting trough, and the control module is disposed in the mounting trough.

7. The non-contact transmission device as claimed in claim 1, wherein the housing is provided with at least one guide rib disposed on an inner wall of the circumferential frame and extending from the opening toward the positioning trough, and an outer side of the retainer is formed with at least one guide groove corresponding to the guide rib so that the guide rib is slidably connected to the guide groove.

8. The non-contact transmission device as claimed in claim 1, wherein the plate of the housing is provided with a pair of lugs each formed with a perforation.

\* \* \* \* \*